United States Patent [19]
Jirnov et al.

[11] Patent Number: 5,996,355
[45] Date of Patent: Dec. 7, 1999

[54] THERMODYNAMIC CLOSED CYCLE POWER AND CRYOGENIC REFRIGERATION APPARATUS USING COMBINED WORK MEDIUM

[76] Inventors: Olga Jirnov; Alexei Jirnov, both of 8951 Braesmont, Apt. 134, Houston, Tex. 77096

[21] Appl. No.: 08/929,294

[22] Filed: Sep. 5, 1997

Related U.S. Application Data

[63] Continuation-in-part of application No. 08/641,511, May 1, 1996, Pat. No. 5,713,210, which is a continuation-in-part of application No. 08/582,122, Jan. 2, 1996, Pat. No. 5,758, 501, which is a continuation-in-part of application No. 08/400,764, Mar. 8, 1995, Pat. No. 5,511,525.

[51] Int. Cl.$^6$ .................................. F25B 9/00; F25D 9/00
[52] U.S. Cl. ................................. 62/87; 62/238.2; 62/402
[58] Field of Search .................................. 62/87, 92, 401, 62/402, 238.2

[56] References Cited

U.S. PATENT DOCUMENTS

| | | | |
|---|---|---|---|
| 3,913,351 | 10/1975 | Edwards | 62/87 X |
| 3,967,466 | 7/1976 | Edwards | 62/87 X |
| 4,027,993 | 6/1977 | Wolff | 60/649 X |
| 4,041,708 | 8/1977 | Wolff | 60/649 |
| 4,088,426 | 5/1978 | Edwards | 62/402 X |
| 4,187,692 | 2/1980 | Midolo | 62/402 |
| 4,187,694 | 2/1980 | Midolo | 62/402 |

FOREIGN PATENT DOCUMENTS

| | | | |
|---|---|---|---|
| 486192 | 1/1976 | U.S.S.R. | 62/402 |
| 779750 | 11/1980 | U.S.S.R. | 62/238.2 |
| 1262219 | 10/1986 | U.S.S.R. | 62/402 |
| 1495601 | 7/1989 | U.S.S.R. | 62/402 |

*Primary Examiner*—Christopher B. Kilner
*Attorney, Agent, or Firm*—Kenneth A. Roddy

[57] ABSTRACT

A thermodynamic closed cycle power and cryogenic refrigeration apparatus which simultaneously produces power and refrigeration. A mixture of a non-condensable first gas such as helium or hydrogen that is in state far from its saturation point and a condensable second gas such as nitrogen or ammonia that is capable of condensing during a working process but non-freezable is isothermally compressed in a sliding-blade gas/liquid compressor then the liquid content that absorbed adiabatic heat during compression of the gas/liquid mixture is separated from the mixture in a vortex separator. The cool non-condensable first gas is supplied to a heat exchanger and isobarically heated using heat of the ambient air or other low-temperature heat source to produce cool refrigerated air. The heated and compressed first gas enters a sliding-blade gas expander and adiabatic expanded and cooled while performing useful work by causing simultaneous rotation of the gas/liquid compressor rotor and gas expander rotor. The adiabatically expanded cool first gas enters a vortex ejector/mixer and is mixed with the separated liquified second gas to serve as a coolant and facilitate rejection of adiabatic heat and supplement the cool gas/liquid mixture which is being fed to the gas/liquid compressor and isothermally compressed to complete the cycle.

14 Claims, 8 Drawing Sheets

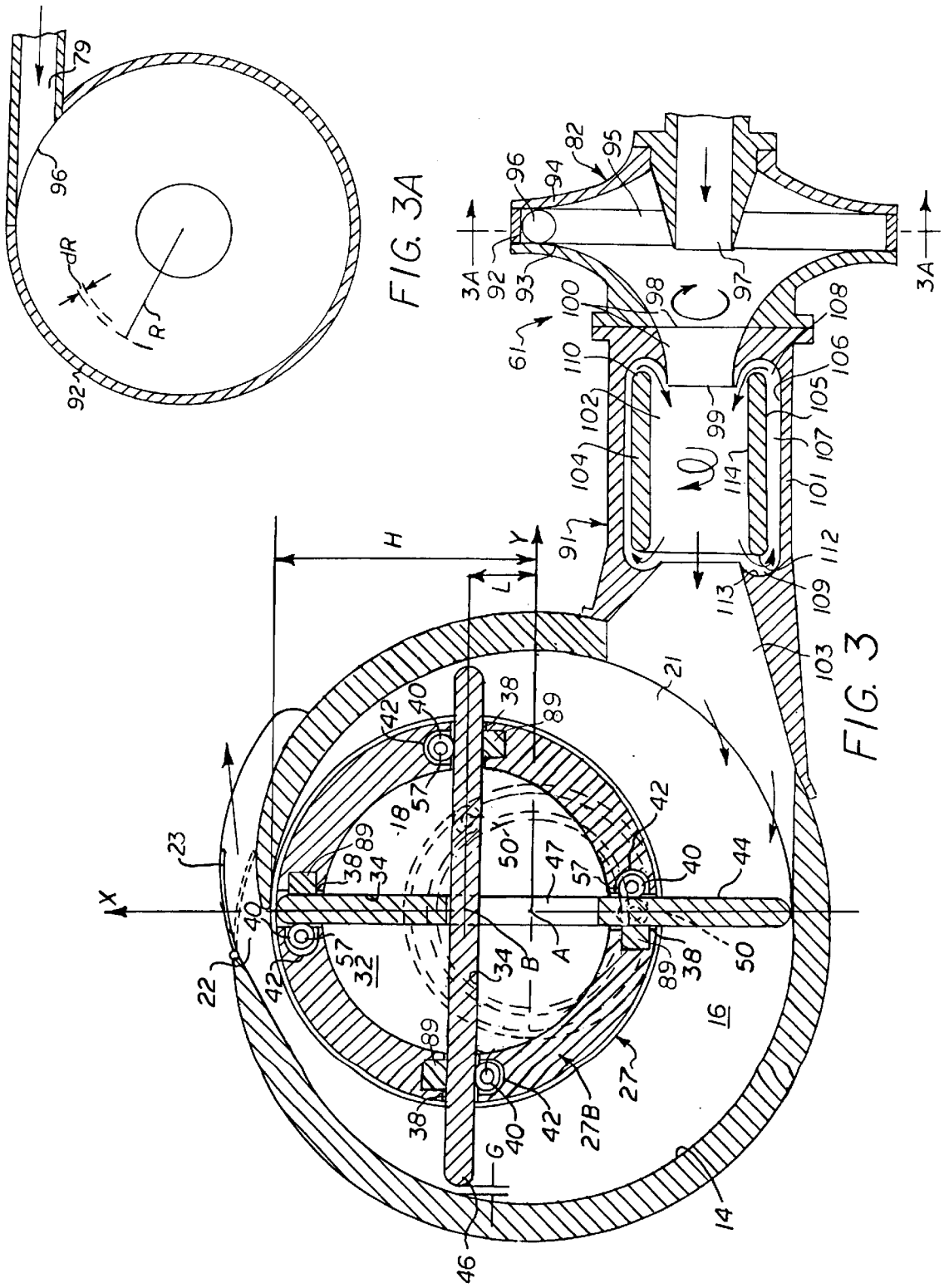

THERMODYNAMIC CLOSED CYCLE POWER AND CRYOGENIC REFRIGERATION APPARATUS USING COMBINED WORK MEDIUM

This application is a continuation in part of Ser. No. 8/641,511, filed May 1, 1996, U.S. Pat. No. 5,713,210, which is a CIP of Ser. No. 8/582,122, Jan. 2, 1996, U.S. Pat. No. 5,758,501, which is a CIP of Ser. No. 08/400,764 filed Mar. 8, 1995 now U.S. Pat. No. 5,511,525.

BACKGROUND OF THE INVENTION

1. Field of the Invention

This invention relates generally to heat engines and refrigeration apparatus and more particularly to a combination heat engine and cryogenic refrigeration apparatus that utilizes a low temperature heat source and a mixture of a non-condensable gas and a condensable gas to produce power and refrigeration simultaneously.

2. Brief Description of the Prior Art

The development of the 2nd Law of Thermodynamics is based primarily on heat engine analysis. The gist of Kelvin's statement of the 2nd Law Of Thermodynamics is that no cylic process is possible whose sole result is a flow of heat from a single reservoir and the performance of equivalent work.

It is known that any system operating on a cycle and receiving heat while doing work must also have a heat-rejection process as part of the cycle. A heat-rejection or heat-recuperation process may be make up in closed cycles with only a single external heat reservoir provided that the work medium is a combined mixture of a non-condensable first gas and a condensable second gas, wherein the condensable second gas is used as an internal cold reservoir to carry out the heat-rejection process and the non-condensable first is isothermally compressed and adiabatically expanded performing useful work. Therefore, it is possible to construct a heat engine which will do work and exchange heat with a single external heat reservoir.

The present invention employs a sliding-blade gas/liquid compressor operating in a closed cyle which effectively isothermally compresses a two-phase working medium mixture of gas and fine dispersed liquid (heat capacitance phase) which absorbs adiabatic heat in the compression process.

Most conventional high speed gas turbine compressor are not able to operate utilizing a two-phase gas/liquid medium since a liquid of the mixture produces destructive erosion of blades. In the present invention the liquid phase is not a destructive factor for the sliding-blade gas/liquid compressor, but instead, improves the compression process by providing the means for hydraulically packing the clearances.

Sliding-vane pumps are known in the art which are designed for performing a plurality of function in which vane radial travel is accomplished by the interaction between vane tips with the internal body bore. Ruzic, U.S. Pat. No. 5,144,802 discloses such a rotary fluid apparatus having pairs of connected vanes.

The principle disadvantage of such apparatus is that their design does not allow inlet and outlet channels at the full width of operating chambers which lowers its filling coefficient and leads to elevated hydrodynamic losses and also causes intensive wear of the vane tips. Moreover, lubricant is, present in the operating chamber which excludes it's application as a gas/liquid compressor.

Hiroshi et al, U.S. Pat. No. 5,044,910 discloses a vane pump with rotatable drive means for vanes wherein the vane tips are prevented from contacting the internal body bore. However, in this type of pump, the vane movement control means are positioned in the operating chambers and are not protected from interaction with the working medium. Moreover, the short vanes extend maximally in rotor slots and are subjected to large bending loads that subject the slot area to distortion and results in increased resistance as they slide in the slots.

Vane-type rotary pumps are also known in the art wherein the vanes are prevented from contacting the internal bore of the body. Chi, U.S. Pat. No. 5,385,458 discloses a vane-type rotary compressor. Eckharolt, U.S. Pat. No. 5,316,456 discloses a slide vane machine. Clerc, U.S. Pat. No. 2,562,698 discloses a rotary compressor having short vanes resting on rollers. Because of the large bending moment, such short vanes do not give full value positive effect.

One of the main disadvantages of the aforementioned apparatus is their intolerance of small amounts of liquids, because the critical surfaces of the structures requiring lubrication are not isolated from the working medium. For example, vane tips sliding over the fixed wall, vane movement control means and the like.

The sliding-blade gas/liquid compressor of the present invention overcomes the above described problems.

SUMMARY OF THE INVENTION

It is therefore an object of the present invention to provide a closed cycle power and refrigeration apparatus which can generate a large amount of refrigeration and power simultaneously.

It is another object of this invention to provide a closed cycle power and refrigeration apparatus which may employ a variety of lower temperature heat sources, including solar, ambient air, geothermal heat, etc., and thus has applicability in earth as an engine or refrigeration apparatus in industry, as well as applications for outer space and other planets.

A further object of this invention is to provide a closed cycle power and refrigeration apparatus which does not produce environmentally damaging emissions.

A still further object of this invention is to provide a closed cycle power and refrigeration apparatus which is inexpensive to manufacture in mass production and is inexpensive to operate, service, and repair.

Other objects of the invention will become apparent from time to time throughout the specification and claims as hereinafter related.

The above noted object of the invention are accomplished by a combined power and refrigeration apparatus having a thermally insulated housing, a sliding-blade gas/liquid compressor, a sliding-blade gas expander, a vortex separator, a heat exchanger, a vortex ejector/mixer, gas and liquid storage tanks, temperature and pressure sensor and control means for adjustably controlling the volume of fluids in the system. The compressor and expander have oval-shaped operating chambers with cylindrical rotors rotatably mounted eccentrically therein. Each rotor has at least two rectangular blades slidably mounted in slots extending through the cylindrical rotor in mutually perpendicular relation and each blade is independently movable relative to the other in a radial direction. Each blade has a guide element extending from opposed sides and through the opposed end walls of the respective rotor which are slidably received in guide grooves in the respective chamber end walls. The rotors are connected together by shafts in concentric relation whereby rotation of the expander rotors causes simultaneous rotation of the gas/liquid compressor rotor and the guide elements traveling in the cylindrical-shaped guide grooves cause the blades to extend and retract radially with their outer ends following the inner periphery of the respective chamber side wall with a constant minimum clearance. The movement control members of the sliding-blades are lubricated and reliably isolated from the working medium.

In operation, rotation of the gas/liquid compressor rotor draws a cool mixture of a non-condensable first gas and a condensed gas (liquid) from the vortex ejector/mixer into the gas/liquid compressor operating chamber. The gas/liquid mixture is isothermally compressed and discharged into the vortex separator where the liquid content of the compressed mixture is separated, passes to the vortex ejector/mixer, mixed with expanded and cooled first gas producing against cool gas/liquid mixture.

Compressed and separated first gas enters the vortex heat exchanger, is isobarically heated to produce refrigerated air and then enters the expander operating chamber where it is adiabatic expanded and supercooled doing useful work by simultaneously rotating the expander and gas/liquid compressor rotors. The adiabatically expanded and cooled first gas with a cryogenic temperature is discharged from the expander and enters the vortex ejector/mixer and mixed with the liquified second gas to serve as a coolant and facilitate rejection of adiabatic heat and supplement the cool gas/liquid mixture which is being fed to the gas/liquid compressor and isothermally compressed to complete the cycle.

BRIEF DESCRIPTION OF THE DRAWINGS

FIG. 3 is a vertical cross section through the gas/liquid compressor chamber and the vortex ejector/mixer of the power and cryogenic refrigeration apparatus along line 3—3 of FIG. 1.

FIG. 3A is a horizontal cross section through the vortex ejector/mixer of the power and cryogenic refrigeration apparatus taken along line 3A—3A of FIG. 3.

DESCRIPTION OF THE PREFERRED EMBODIMENT

Figure 1:
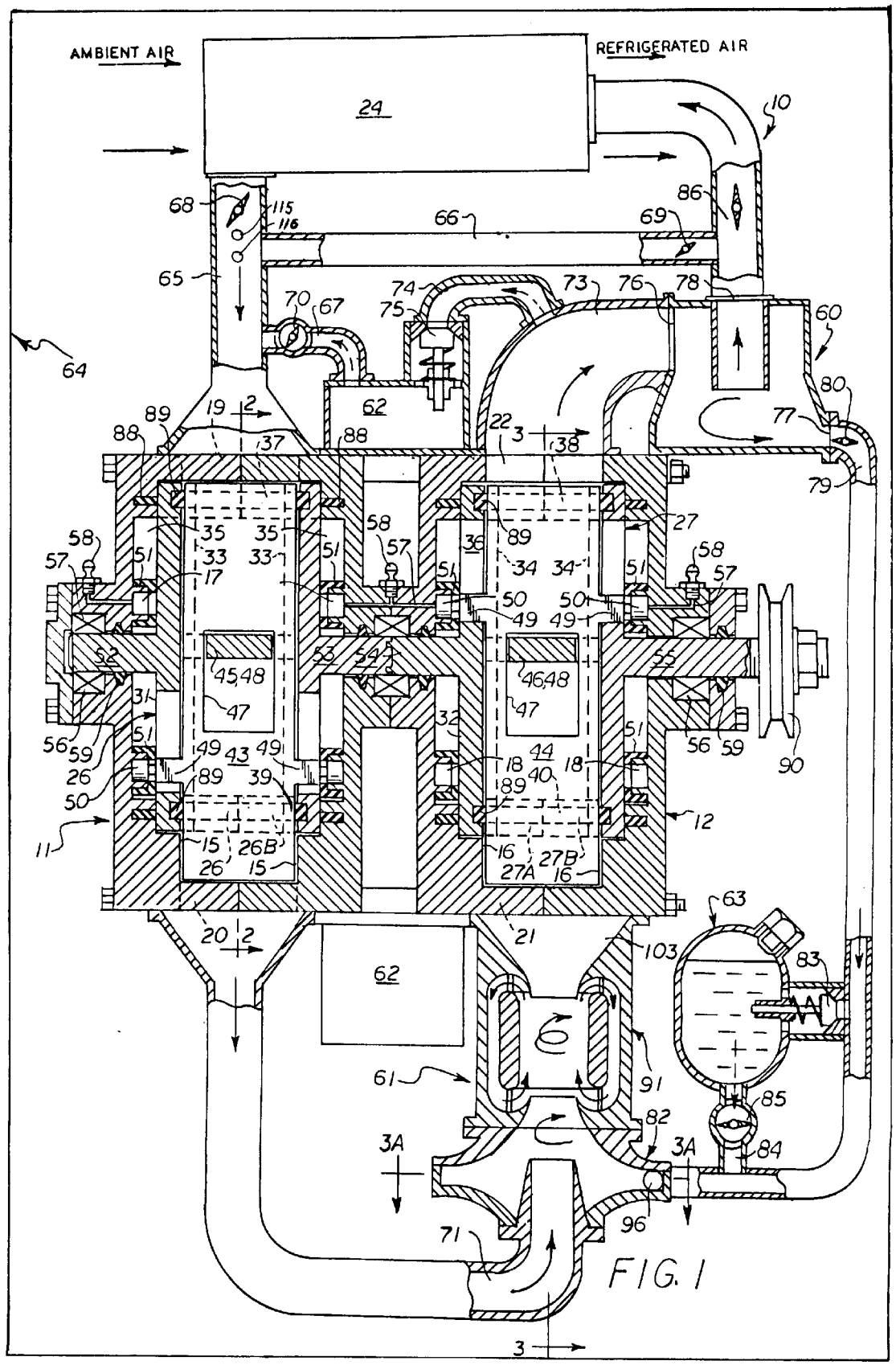
FIG. 1 is a longitudinal cross section through the power and cryogenic refrigeration apparatus in accordance with the present invention.
Figure 2:
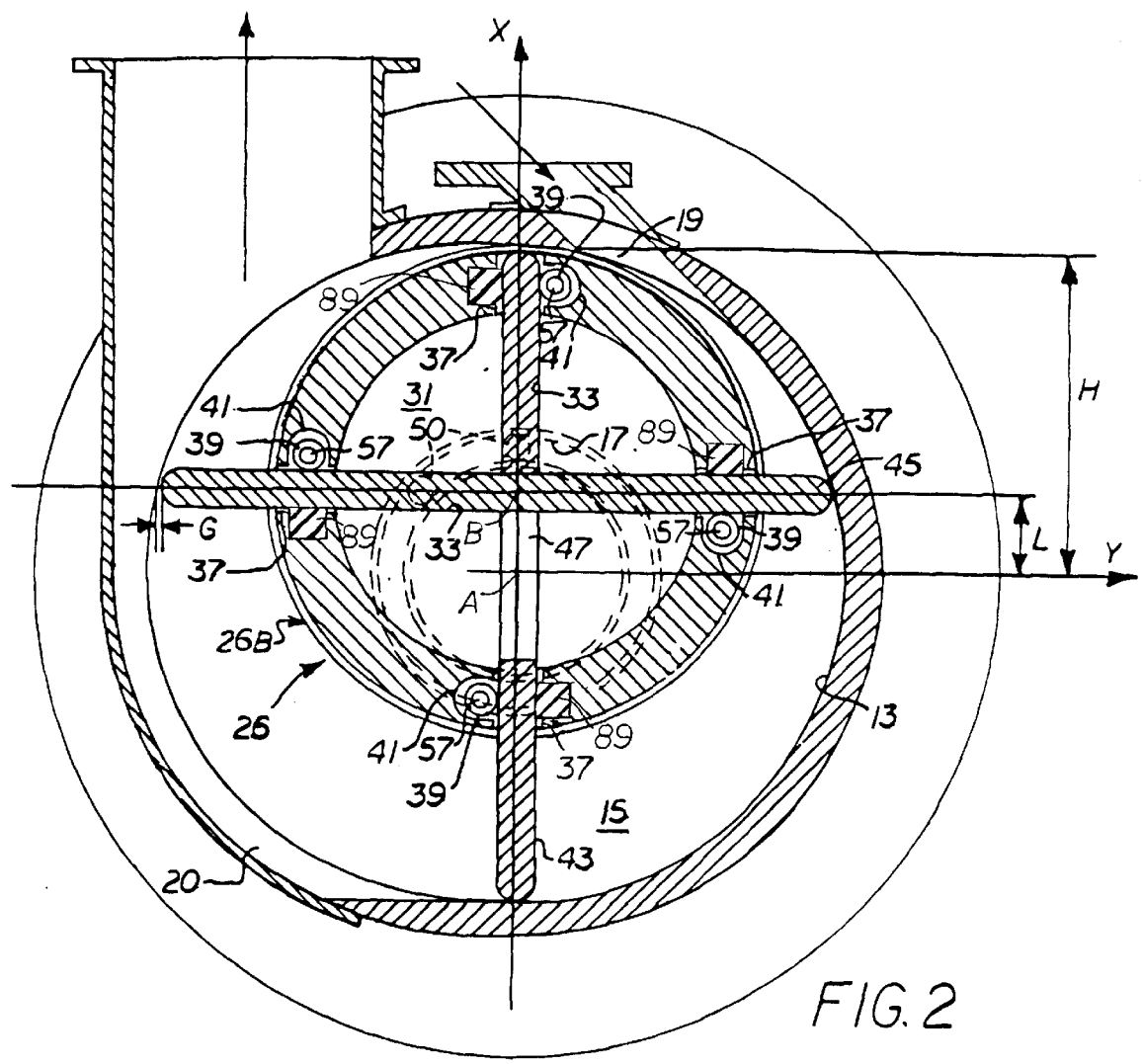
FIG. 2 is a vertical cross section through the expander chamber of the power and cryogenic refrigeration apparatus taken along line 2—2 of FIG. 1.

Referring to the drawing by numerals of reference, a preferred power and cryogenic refrigeration apparatus in accordance with the present invention is shown in vertical cross section in FIGS. 1, 2, and 3. The apparatus 10 has an oval shaped expander operating chamber 11 an adjacent gas/liquid compressor operating chamber 12, vortex separator 60, heat exchanger 24, vortex ejector/mixer 61, gas storage tank 62, liquid storage tank 63, and, with the exception of the heat exchanger, is contained within a thermally insulating housing 64. A non-condensable first gas such as helium or hydrogen far from its saturation point is stored in the gas storage tank 62, and a non-freezable condensed second gas such as nitrogen or ammonia that is capable of condensing during a working process, is stored in the liquid storage tank 63 under high pressure.

The expander operating chamber 11 is shown in vertical cross section in FIG. 2 and the gas/liquid compressor operating chamber 12 is shown in vertical cross section in FIG. 3. The expander operating chamber 11 and the compressor operating chamber 12 are each defined by oval-shaped cavities having contoured oval-shaped side walls 13 and 14 and opposed facing flat end walls 15 and 16, respectively.

Continuous cylindrical-shaped guide grooves 17 and 18 are formed in the opposed interior surfaces of the flat end walls 15 and 16 of the expander operating chamber 11 and compressor operating chamber 12, respectively. The interior and exterior peripheral surfaces of the guide grooves 17 and 18 are raised above the flat surface of the end walls. The center "A" of the cylindrical-shaped guide grooves is concentric with the center of the oval-shaped expander chamber 11 and compressor operating chamber 12.

As best seen in FIG. 2, the expander chamber 11 has an inlet port 19 through its side wall 13 positioned at an angle to allow entry of the working medium into the chamber tangential to the plane of rotation and a relatively large outlet port 20 which extends circumferentially along approximately one-half of its side wall and allows the working medium to exit tangential to the plane of rotation. The width of the inlet port 19 and outlet port 20 are approximately the same width as the expander chamber 11 to provide maximum filling of the volume of the chamber and minimize hydrodynamic loss.

As best seen in FIG. 3, the compressor chamber 12 has a intake ports 21 circumferentially spaced along partly of its side wall 14 positioned at an angle to allow entry of a gas/liquid mixture into the chamber tangential to the plane of rotation and an angular exhaust port 22 through its side wall which allows the gas/liquid mixture to exit tangential to the plane of rotation. The width of the intake ports 21 and exhaust port 22 are approximately the same weight as the compressor chamber 12 to provide maximum filling of the volume of the chamber and minimize hydrodynamic loss. The exhaust port 22 is provided with a one-way valve 23 which allows the gas/liquid mixture to flow only out of the compressor operating chamber.

A sliding-blade expander rotor 26 and a sliding-blade compressor rotor 27 are rotatably disposed in the respective expander operating chamber 11 and compressor operating 12.

Figure 4:
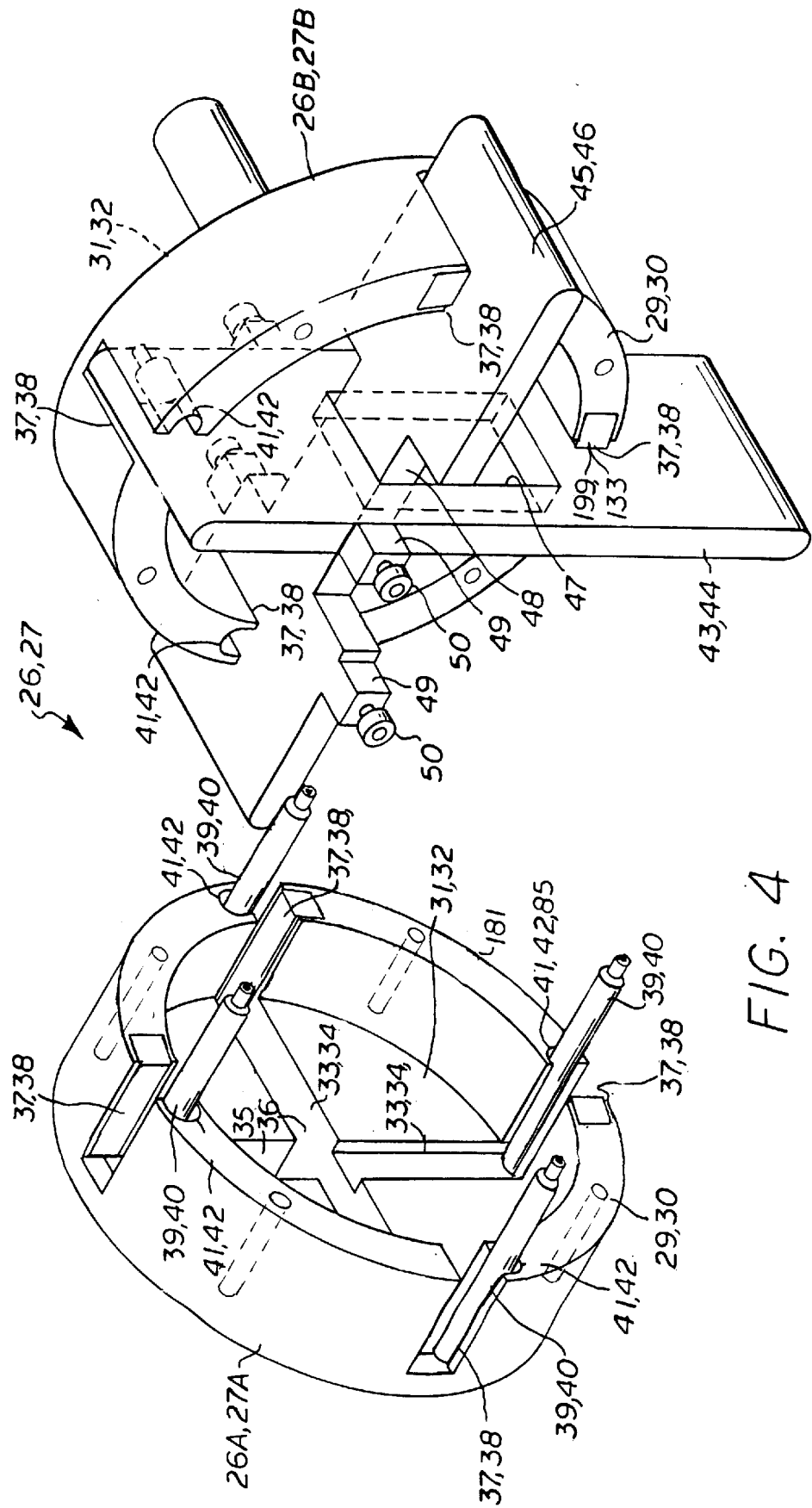
FIG. 4 is an exploded isometric view of the expander and gas/liquid compressor rotor of the power and cryogenic refrigeration apparatus shown in an unassembled condition.
Figure 5:
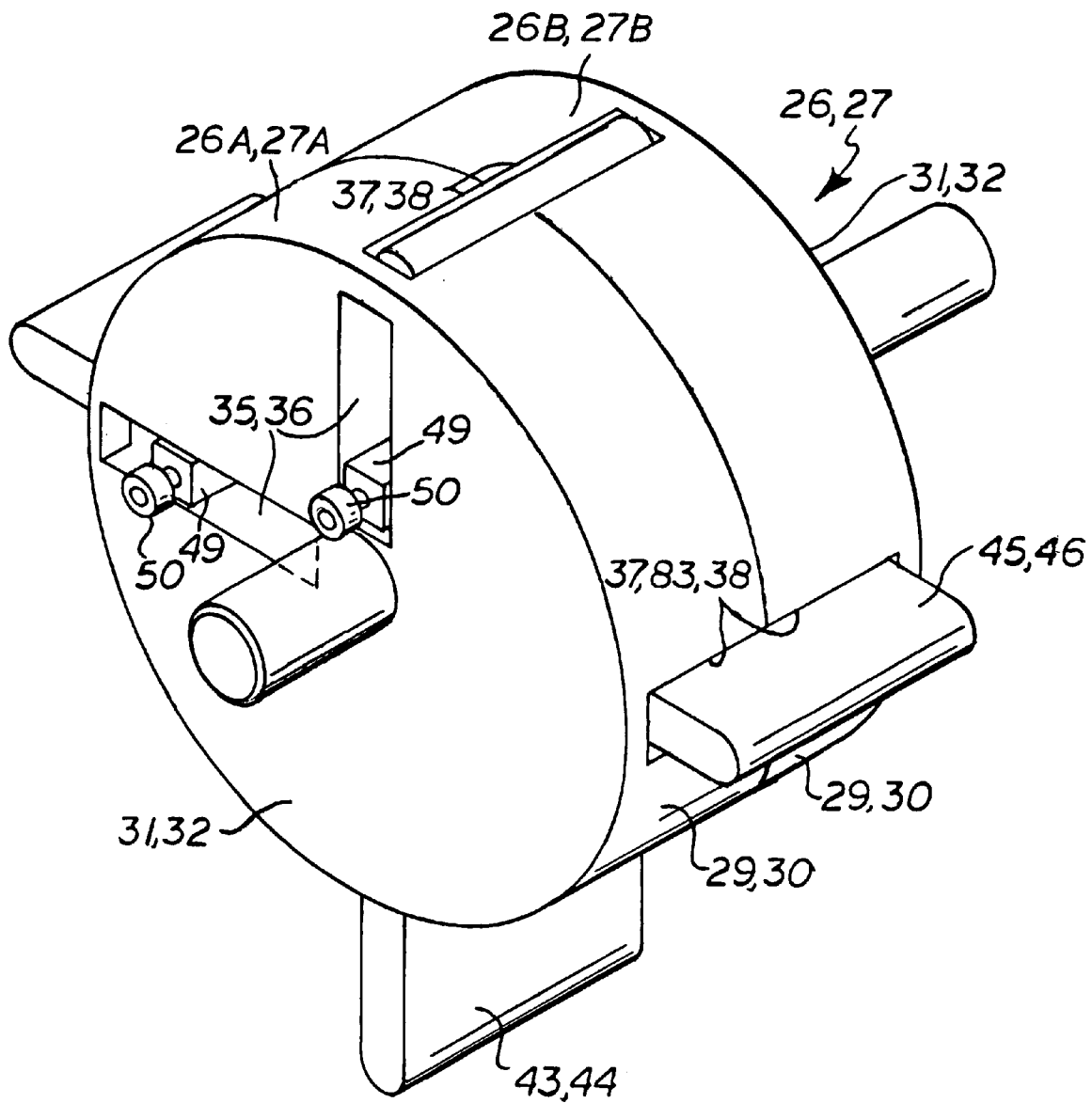
FIG. 5 is an isometric view of the expander and gas/liquid compressor rotor of the power and cryogenic refrigeration apparatus shown in an assembled condition.

As best seen in FIG. 4 and 5, the expander rotor 26 and compressor rotor 27 are each formed by a pair of opposed hollow cylindrical members 26A, 26B and 27A, 27B, respectively, each having a circular side wall 29 and 30 and an end wall 31 and 32. A pair of perpendicular elongate rectangular slots 33 and 34 are formed in the interior surface of the end walls 31 and 32 of the cylindrical member 26A, 26B and 27A, 27B and extend through the center of rotation of the cylindrical members. A portion of the slots 33 and 34 on one side of the center of rotation extend all the way through the flat end walls 31 and 32 of the cylindrical members 26A, 26B and 27A, 27B to form a pair of rectangular perpendicular slots 35 and 36 through the outer surface of the flat end walls 31 and 32, as best seen in FIG. 5.

A series of circumferentially spaced rectangular slots 37 and 38 extend through the circular side walls 29 and 30 of the circular members 26A, 26B and 27A, 27B from their open end and terminate at the flat end walls 31 and 32 in axial alignment with the slots 33 and 34 in the flat end walls.

As shown in FIGS. 2, 3, and 4, rollers 39 and 40 are mounted in recesses 41 and 42 in the side walls 29 and 30 of the cylindrical member 26A, 26B and 27A, 27B closely adjacent each slots 37 and 38 with their curved exterior surface protruding a short distance into the slot opening.

A pair of perpendicular elongate rectangular rigid blades 43, 44, and 45, 46 are slidably received in the elongate slots 33 and 34, respectively. One blade 43, 45 of each pair is provided with a central rectangular opening 47 and the other blade 44, 46 of each pair is provided with a central narrow rectangular portion 48 which is received through the opening 47 such that the perpendicular blades 43, 44, and 45, 46, can slide independently relative to one another. A foot lug 49 extends outwardly a short distance from the opposed side edges of each blade 43, 44, and 45, 46 in opposed relation, and a roller 50 is rotatably mounted at the outer end of each lug.

As shown in FIG. 5, the circular members 26A, 26B and 27A, 27B are secured together in opposed relation over the blades 43, 44 and 45, 46 to form a circular drum configuration. The outer ends of the blades 43, 44 and 45, 46 extend slidably through the slots 37 and 38 in the circular side walls 29 and 30 and are supported on opposed sides by the rollers 39, 40 as seen in FIGS. 2 and 3. In the assembled condition, the lugs 49 and rollers 50 extend through the slots 35 and 36 in the flat end walls 31 and 32 and the rollers 50 are received and travel in the continuous guide grooves 17 and 18 in the opposed interior surfaces of the flat end walls 15 and 16 of the expander operating chamber 11 and compressor operating chamber 12, respectively, as seen in FIG. 1. A lubricant is supplied to the rollers 50 through channels 57 and lubricators 58. An, elastomeric seal collar 51 is installed on the raised interior and exterior peripheral surfaces of the guide grooves 17 and 18 and forms a fluid sealing relation against the exterior surfaces of the end walls 31 and 32 of the cylindrical members 26A, 26B and 27A, 27B. An elastomeric seal 88 is installed in annular grooves formed in opposed inward facing surfaces of the flat end walls 15 and 16 of the expander operating chamber 11 and the compressor operating chamber 12, respectively. These seals form a peripheral fluid sealing relation between stationary walls 15 and 16 rotating flat end walls 31 and 32 of the cylindrical rotor members 26 and 27, respectively.

As best seen in FIGS. 1, 2, 3, and 4 generally L-shaped elastomeric seals 89 are installed in slots 37 and 38 adjacent the rollers 39 and 40 and in grooves at the outer ends of slots 33 and 34 of the cylindrical members 25A–25B and 26A–26B of the gas expander rotor 26 and gas/liquid compressor rotor 27, respectively. These seals enclose the sliding blades on three sides and form a fluid sealing relation between stationery surfaces of slots 37, 38 and slots 33, 34 of the cylindrical members 25A–25B and 26A–26B and the moving surface of the blades opposite the rollers 39 and 40 and also the edge surfaces of the blades.

As best in FIG. 1, a shaft 52 secured to the exterior of the flat end wall 31 of one the expander rotor cylindrical members 26A extends outwardly from its center through a hole in the flat end wall 15 of the expander chamber 11 and a coaxial opposed shaft 53 secured to the exterior of the opposed flat end wall 31 of the opposed cylindrical member 26B extends outwardly from its center through a hole in the opposed flat end wall 15 of the expander chamber 11. Similarly, a shaft 54 secured to the exterior of the flat end wall 32 of one of the compressor rotor cylindrical members 27A extends outwardly from its center trough a hole in the flat end wall 16 of the compressor chamber 12 and a coaxial opposed shaft 55 secured to the exterior of the opposed flat end wall 32 of the opposed cylindrical member 27B extends outwardly from its center through a hole in the opposed flat end wall 16 of the compressor chamber 12. The shafts 52, 53, 54, and 55 are journalled in the engine housing by bearing 56 and packing glands 59. The shafts 53 and 54 of the expander rotor 26 and compressor rotor 27 are joined together by splines or other suitable means such that the rotors rotate together. A pulley 90 is mounted on the outer end of the shaft 55 for power take off.

The centerline "B" of the shafts 52 and 55 and rotors 26 and 27 is eccentrically offset from the center "All" of the oval-shaped expander and compressor chamber 11 and 12. The offset distance or eccentricity is "L".

When the expander and compressor rotors 26 and 27 turn, the blades 43, 44 and 45, 46 reciprocate radially resting on the rollers 39, 40 mounted in the walls 29, 30 of the cylindrical members 26A, 26B and 27A, 27B to form four vane blades of variable length in the respective operating chamber and function as pistons during the compressing and expansion of the working medium. The radial travel of the blades 43, 44 and 45, 46 is regulated by the guide grooves 17 and 18 in which the rollers 50 at the ends of the lugs 49 of each blade travel.

It should be understood, that although the expander rotor 26 and compressor rotor 27 have been shown and described with a pair of blade members, the rotors may utilize any number of blades.

Figure 2A:
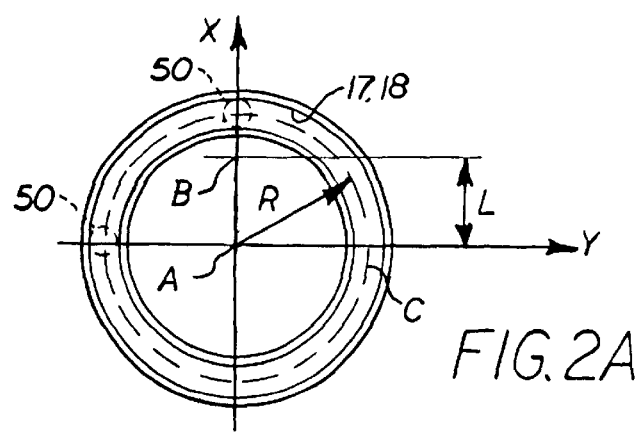
FIG. 2A is a partial elevation view of the guide groove formed in the end walls of the expander and gas/liquid compressor chambers of the power and cryogenic refrigeration apparatus.

Referring now to FIG. 2, 2A, and 3, the centerline "B" of the shafts 52–55 and rotors 26 and 27 is eccentrically offset from the center of the oval-shaped expander and compressor chamber 11 and 12 and the guide grooves 17 and 18 by a distance L. The sliding-blades 43, 44 and 45, 46 of the expander rotor 26 and compressor rotor 27 are of a predetermined length to provide a constant minimum clearance gap "G" between the outer tip ends of the blades and the interior surface of the oval side walls 13 and 14 of the expander chamber 11 and compressor chamber 12, respectively.

In the preferred embodiment, the centerline "C" of the guide grooves 17 and 18 in the rotation plane of the expander and compressor rotors 26 and 27 is the circuit with the radius "r". This radius "r" must be greater than the eccentricity "L". The centerline "C" of the cylindrical guide grooves is defined by the equation: $x^2+y^2=r^2$; where x and y=the vertical and horizontal coordinates, r=the circuit radius, and L=eccentricity of the center of rotor rotation relative to the central axis of the chamber and guide grooves.

The inner surface of the oval of the expander and compressor chamber side walls 13 and 14 in the rotation plane of the rotor are calculated and configured according the equation:

$$\frac{x^2}{h^2} + \frac{y^2}{(h+1/4L)^2 - L^2} = 1$$

where x and y=horizontal and vertical coordinates,
h=half of vane length=half of large oval axis, and
L=eccentricity.

As shown in FIG. 1, the intake port 19 of the expander chamber 11 is connected to the interior of the heat exchanger assembly 24 by a conduit 65 containing a throttle 68 and to the interior of the gas storage tank 62 by a conduit 67 containing a throttle 70. The exhaust port 20 of the expander chamber 11 is connected to the interior of the vortex ejector/mixer 61 by a conduit 71. The intake port 21 of the gas/liquid compressor chamber 12 is connected to the outlet diffuser 103 of the vortex ejector mixer 61. The exhaust port 22 of the gas/liquid compressor chamber 12 is connected to the inlet port 76 of the vortex separator 60 by a conduit 73 and joined through a one-way spring valve 75 to the interior of the gas storage tank by a conduit 74 connected to the conduit 73.

The vortex separator 60 is a generally cylindrical member enclosed at its top and bottom ends and having a larger diameter at the bottom. The vortex separator 60 has a tangential inlet port 76 extending through the upper end of its side wall which allows a high pressure gas/liquid mixture from the gas/liquid compressor 12 to enter tangentially into the separator 60, and has a tangential liquid outlet port 77 extending through the lower end of its side wall. The liquid outlet port 77 is connected to the tangential inlet port 96 of the vortex ejector 82 of the vortex ejector/mixer 61 (described below) by a conduit 79 containing a throttle 80. The vortex separator 60 has a central gas outlet 87 at its upper end which is connected to the interior of the heat exchanger assembly 24 by a conduit 86 containing a throttle 87.

In the vortex separator 60 the gas and liquid are divided or stratified by centrifugal force. Liquid exits through the tangential liquid outlet port 77 and gas exits through the central gas outlet 78. The conduit 65 between the intake port 19 and the heat exchanger 34 and the conduit 86 between the gas outlet 78 of the vortex separator 60 and the heat exchanger are joined together by a bypass conduit 66 containing a throttle 69. The bypass conduit 66 is disposed below the throttles 68 and 87 to conduct flow through the bypass when the throttle 69 is open and the throttles 68 and 87 are closed.

The liquid storage tank 63 has an inlet connected to the conduit 79 through a one-way spring valve 83 and has an outlet connected to the conduit 79 by a conduit 85 containing a throttle 85.

Temperature and pressure sensors 115 and 116 are disposed in the conduit 65 adjacent to its juncture with the bypass conduit 66. The temperature and pressure sensors 115 and 116 are connected with the throttles 68, 69, 70, 85, and 87 to control their operation in response to the temperature and pressure in the conduit 65, and thereby regulate the power conditions.

The throttles 68, 69, and 87 control the mode of operation of the heat exchanger 24. Throttle 70 meters out the the non-condensable first gas into the system from the gas storage tank 62. Throttle 85 meters out the condensed second gas into the system from the liquid storage tank 63. Throttle 80 located in the conduit 79 allows additional control of the non-condensable first gas and condensed second gas distributed from the vortex separator 60 through the conduits 79 and 86.

The spring valves 75 and 83 maintain a predetermined pressure in the gas storage tank 62 and liquid storage tank 63, respectively.

Referring again to FIG. 1 and additionally to FIG. 3 and 3A the vortex ejector/mixer 61 will be described.

The vortex ejector/mixer 61 has a vortex ejector 82 and an ejector with feedback loop 91 forming a unity flow system. As best seen in FIG. 3 the vortex ejector 82 receives a liquid fluid from the vortex separator 60 and an expanding gas fluid from the gas expander 11 and pre-mixes them to produce a gas/liquid mixture. The vortex ejector 82 has a peripheral cylindrical outer wall 92 enclosed at one end by a front cover plate 93 and at the other end by a rear cover plate 94 each having inwardly contoured side walls forming a central cavity or vortex chamber 95 having an outlet 98 at one end. The liquified gas from the vortex separator 60 enters the inlet port 96 through conduit 79 tangential to the interior of the vortex chamber 95 at its periphery causing the liquified gas to swirl as it enters the vortex chamber. A nozzle 97 is disposed axially in the center of the rear cover plate 94 and extends inwardly a distance into the interior of the vortex chamber 95. The nozzle 97 is connected to the conduit 71 that is connected to the exhaust port 20 of the expander chamber 11.

The ejector with feedback loop 91 has a hollow cylindrical outer wall 101 with an inwardly contoured inlet port 99 at one end and a conical outwardly diverging diffuser outlet 103 at its opposite end. The inlet port 99 is connected to the outlet 98 of the vortex chamber 95 and has an inwardly curved interior which forms a continuation of the inwardly curved surface of the vortex chamber. The inwardly curved surfaces form a nozzle passageway 100. The conical outwardly diverging diffuser outlet 103 at the opposite end of the ejector with feedback loop 91 is connected to the side wall 14 of the gas/liquid compressor operating chamber 12 and its interior joins the tangential intake port 21 of the gas/liquid compressor chamber 12.

A longitudinal toroid 104 having an inner surface 114 defining a central chamber 102 and rounded ends 110 and 112 is positioned coaxially in the interior of the ejector with feedback loop 91 with its outer surface 105 spaced radially inward from the interior surface of the outer wall 101 to form a longitudinal channel 107 between them. The exterior surface of the nozzle 100 and inward facing surface of the diffuser outlet 103 are provided with concave curved surfaces 111 and 113 spaced from the rounded ends 110 and 112 of the toroid 104, to form curvilinear channels 108 and 109 at each end of the toroid. The central chamber 102 of the toroid 104 and the channels 107, 108, and 109 are in fluid communication to form the oblong recirculation channel or "feedback loop" of the ejector with feedback loop 91.

A portion of liquified second gas enters tangentially into the periphery of the vortex chamber 95 of the vortex ejector 82 through the inlet port 96, generating a vortex flow of liquid gas. Simultaneously the non-condensable first gas is ejected through the nozzle 97 into the axis zone of the vortex chamber 95 where it is mixed with the liquid second gas to form a gas/liquid mixture. Because the axis of the nozzle 97 is located in the near-axis zone of the vortex chamber of the ejector 82 where refraction occurs, it is subjected to substantial pressure drop and the operation of ejecting and mixing is intensified.

Vortex flow of the gas/liquid mixture through the nozzle passageway 100 enters the center chamber 102 of the toroid 104 and is conducted along the inner wall 114 of the toroid, through the curvilinear channel 109, the annular ring channel 107 and curvilinear channel 108, generating a longitudinal vortex recirculating flow path (ejector feedback loop) around the toroid 104.

Because of the Pito effect, "longitudinal" vortex circulation of the flow is generated in the ejector with feedback loop 91 around the toroid 104 such that feedback of the streams is achieved in forward and reverse directions. As a result, "transverse" vortex is added with the "longitudinal" vortex, which initiates intensive vortical structure of the streams. Due to the significant centrifugal force developed in the process, separation and stratification of larger droplets of liquid of the condensed second gas takes place inside of this vortical stream.

The larger droplets of liquid captured by centrifugal force in the "longitudinal" vortex pass through the annular ring channel 107 and return to the periphery of the chamber 102 mixing with a near-axis flow to disperse and produce a mixture of fine droplets of the condensed second gas in the non-condensable first in the near-axis zone of the chamber 102 and thereby generate vortex flow of liquid gas.

OPERATION

In operation, at start up, the throttle 68 is closed to disconnect the heat exchanger 24 and throttles 70, 80 and 85 are opened to allow flow between the gas/liquid compressor chamber 12 and expander chamber 11 through the heat exchanger bypass conduit 66. The expander and compressor rotors 26 and 27 are rotated by the external drive pulley 90. Rotation of the gas/liquid compressor rotor 27 draws a cool mixture of the non-condensable first gas and the condensed second gas (liquid) from the vortex ejector/mixer 91 into the gas/liquid compressor operating chamber 12. The gas/liquid mixture is isothermally compressed in the compressor chamber 12 and discharged into the vortex separator 60 where the liquid content of the compressed mixture is separated and passed back to the vortex ejector/mixer 91 to be mixed with the expanded and cooled first gas discharged from the expander chamber 11 and produce the cool gas/liquid mixture.

When the steady state of the duty cycle is reached (determined by the temperature and pressure sensors 115 and 116 in conduit 65) throttles 69, 70 and 85 are closed to shut off flow through the bypass conduit 66 and conduits 67 and 84, and throttles 68 and 87 are opened to allow flow through the heat exchanger 24 and conduits 65 and 86. During operation, the temperature and pressure sensors 115 and 116 control the operation of throttles 68, 87 and 69 to control the heat exchanger 24, throttle 70 to meter out non-condensed first gas into the system from the gas storage tank 62, throttle 85 to meter out condensed second gas into the system from the liquid storage tank 63, and throttle 80 to control the distribution of additional non-condensed gas and condensed gas (liquid) separated by the vortex separator 60 into the respective conduits.

The non-condensable first gas separated from the mixture in the vortex separator 60 enters the heat exchanger 24 where it is isobarically heated using heat of the ambient air or other low-temperature heat source to produce cool refrigerated air which then enters the expander operating chamber 11 where it is adiabatic expanded and cooled and performs useful work by causing simultaneous rotation of the expander rotor 26 and the gas/liquid compressor rotor 27. The adiabatically expanded and cooled first gas with a cryogenic temperature is discharged from the expander chamber 11 and enters the vortex ejector/mixer 91 to be mixed with the liquified second gas and serve as a coolant to facilitate rejection of adiabatic heat and supplement the cool gas/liquid mixture which is fed to the gas/liquid compressor and isothermally compressed to complete the cycle.

Figure 8:
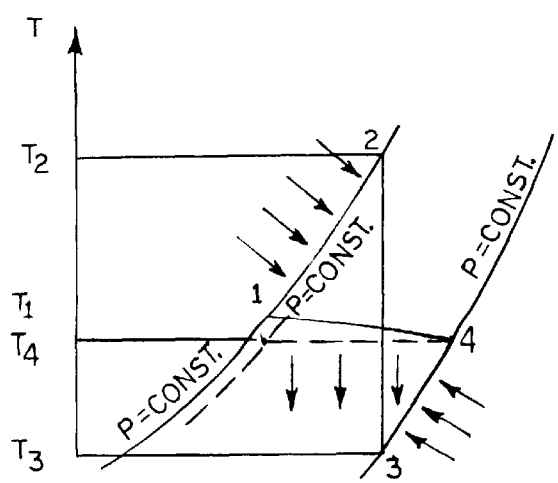
FIG. 8 is a diagram illustrating the thermodynamic cycle of the present power and cryogenic refrigeration apparatus.

Referring now to FIGS. 1, 2, 3, and the thermodynamic diagram of FIG. 8, as the compressor rotor 27 turns, an amount of cool gas/liquid mixture at a temperature $T_4$ and pressure $P_4$ (point 4 in FIG. 8) is drawn into the intake port 21 and, as it travels around the diminishing volume of the oval-shaped compressor chamber 12 it is isothermally compressed to a pressure $P_1$, and temperature $T_1$, (point 1 in FIG. 8) and discharged through the exhaust port 22 and valve 23 into the vortex separator 60 where the gas and liquid are divided or stratified by centrifugal force.

The separated first gas is discharged through the central gas outlet port 78 and the conduit 86 into the heat exchanger 24, where it accepts part of the heat of the ambient air or other heat source thereby isobarically heating it ($P_1=P_2$) to temperature $T_2$ and producing a refrigerating capacity q (point 2 in FIG. 8). The compressed and heated first gas entering the expander operating chamber 11, acts on the blades 43 and 45 of the expander rotor 26 and is adiabatic expanded from pressure $P_2$ to pressure $P_3$ and supercooled to temperature $T_3$ (point 3 in FIG. 8) which is below the boiling temperature $T_4$ of the second gas by performing useful work in causing rotation of the expander rotor 26 and through the shafts 53 and 54 simultaneous rotation of the gas/liquid compressor rotor 27. The pulley 90 now serves as a power take-off means. The sliding blades 43, 44, and 45, 46 move radially relative to one another guided the grooves 17 and 18, as described in detail previously. The expanded and cooled first gas is exhausted from the expander operating chamber 11 through the large exhaust port 20 and discharged through the conduit 71 and the nozzle 97 into near axis zone of the vortex ejector 82.

The compressed and separated second gas in the liquid state is discharged from the outlet port 77 of the vortex separator 60 and conduit 79 and enters through the inlet port 96 tangentially into the periphery of the vortex chamber 95 of the vortex ejector 82.

The vortex ejector 82 creates intensive vortex flow of the liquified second especially in the near-axis zone of the vortex chamber 95 to produce therein a very low pressure zone which generates a drawing force to suck the expanded and super cooled first gas from the expander 11 premixing it and heat exchanging it with the liquified second gas which has adsorbed adiabatic heat.

An estimate of the drawing force of the vortex ejector can be made using a simplified approximation for incompressible flow. If we assume that the tangential velocity $W_t$ of the liquified second gas is predominant in the vortex flow we can estimate the radial pressure distribution P(R). Under the given conditions P can be found from:

$$\frac{dP}{dR} = \rho \frac{W_t^2}{R}$$

Where ρ is the liquified second gas density and R is the current radius of the vortex flow (FIG. 3A).

The gas/liquid mixture discharged from the vortex ejector 82 enters the central chamber 102 of the toroid 104 of the ejector with feedback loop 91 through the nozzle passageway 100, as described previously. The ejector with feedback loop 91 atomizes the condensed second gas, and cools it from temperature $T_1$ to temperature $T_4$.

Interchange of heat from the condensed second gas heated occurs by means of adsorbing adiabatic heat during isothermally compressing the first gas (point 1 in FIG. 8) and supercooling it to the temperature $T_3$ during expansion from pressure $P_2$ to pressure $P_3$ (point 3 in FIG. 8). The finely dispersed cool gas/liquid mixture with pressure $P_4$ and temperature $T_4$ is carried away to the gas/liquid compressor operating chamber 12 (point 4 in FIG. 8) completing the cycle.

The compression process of the first gas (line 1–4 in FIG. 8) can by approximate for two processes; the isothermally compressing process (line 4–5 in FIG. 8) and the adiabatic compressing process (line 5–1 in FIG. 8). The pressure $P_5$ at the point 5 can by found from the heating balance:

$m_1(Q \text{ adiab.} - Q \text{ isot.}) = m_2 \, Q \text{ ads.}$, Or:

$$m_1 R T_4 \left\{ \frac{k}{k-1} \left[ \left(\frac{P_5}{P_4}\right)^{\frac{k-1}{k}} - 1 \right] - \ln \frac{P_5}{P_4} \right\} =$$

$$Cp.l \, m_2 \left[ T_4 - \left(T_2 \left(\frac{P_3}{P_2}\right)\right)^{\frac{k-1}{k}} \right] = Cp.g \cdot m_1 \left[ T_4 - \left(T_2 \left(\frac{P_3}{P_2}\right)\right)^{\frac{k-1}{k}} \right]$$

where Q adiab.=the heat amount by adiabatic pressing of the first gas from pressure $P_5$ to $P_1$, Q isot.=the heat amount by isothermal pressing of the first gas from pressure $P_4$ to $P_5$, Q ads.=the adsorbing adiabatic heat amount by means of the liquified second gas.

$m_1$, $m_2$=mass flow rate of first and second gas respectively, k=adiabatic exponent, R=specific gas constant, $\Pi = P_2/P_3$=expansion ratio of first gas, Cp.l=specific heat of liquified second gas, Cp.g=specific heat of first gas.

The dependence of the theoretical specific power N of the present apparatus is calculated according to the following equation:

$$N = \frac{k}{k-1} R \left\{ T_2 \left[ 1 - \left(\frac{P_3}{P_2}\right)^{\frac{k-1}{k}} \right] - T_4 \left[ \left(\frac{P_1}{P_5}\right)^{\frac{k-1}{k}} - 1 \right] \right\} - R T_4 \ln \frac{P_5}{P_4}$$

The refrigerating capacity q is calculated according to the following equation:

$q = Cp.g \, m_1 (T_2 - T_1)$

Figure 6:
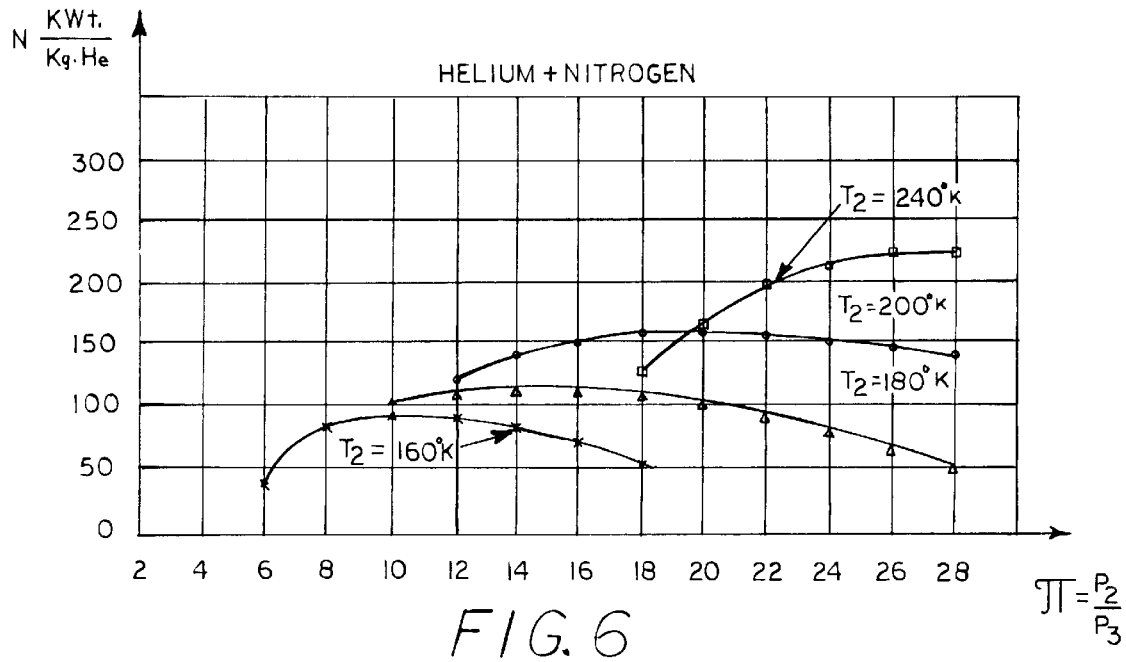
FIG. 6 is a graph showing of the dependence of the theoretical specific power of the present apparatus on the pressure ratio and the peak temperature of the first gas utilizing a mixture of helium and nitrogen.
Figure 7:
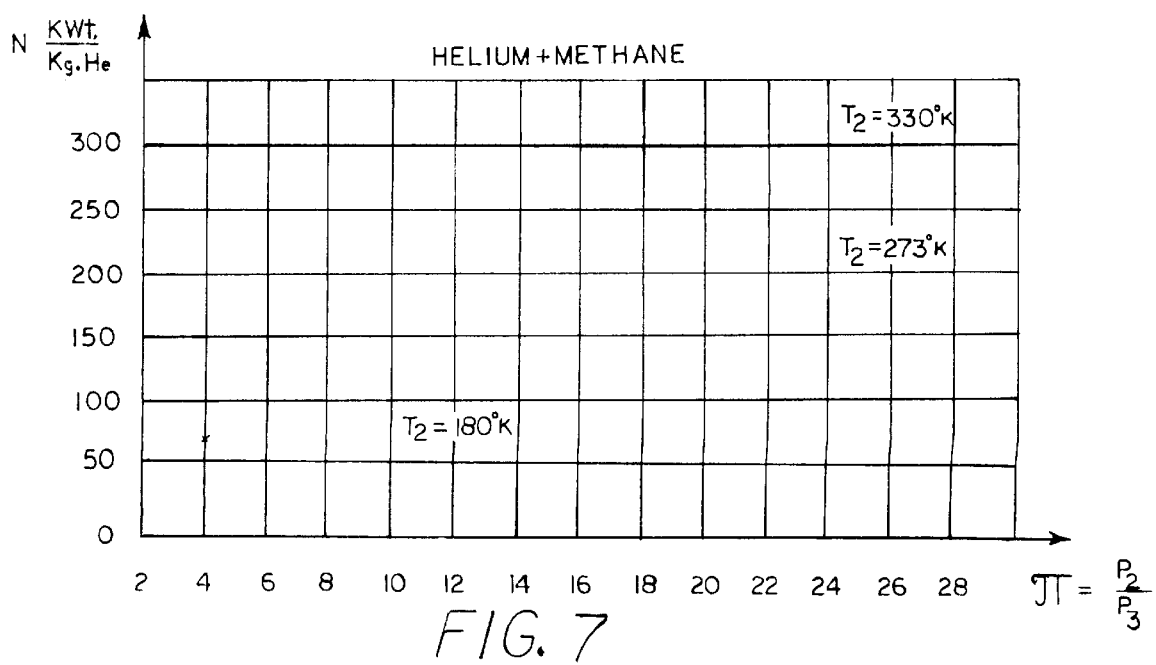
FIG. 7 is a graph showing of the dependence of the theoretical specific power of the present apparatus on the pressure ratio and peak temperature of the first gas utilizing a mixture of helium and methane.

FIGS. 6 and FIG. 7 are the graphs showing the dependence of the theoretical specific power N kwt/Hg.He on the pressure ratio $\Pi = P_2/P_3$ and the temperature $T_2$ of the working first gas using a mixture of helium and nitrogen and using a mixture of helium and methane, respectively. Specific power is calculated by expanding the mass flow rate of helium $m_1$=kg/sec=1. The pressure $P_4 = P_3$ is recognized as "1 kg./Sm$^2$" and temperature $T_4°$ k. as the boiling temperature of the liquefied second gas at $P_4$=1kg./Sm$^2$.

Figure 10:
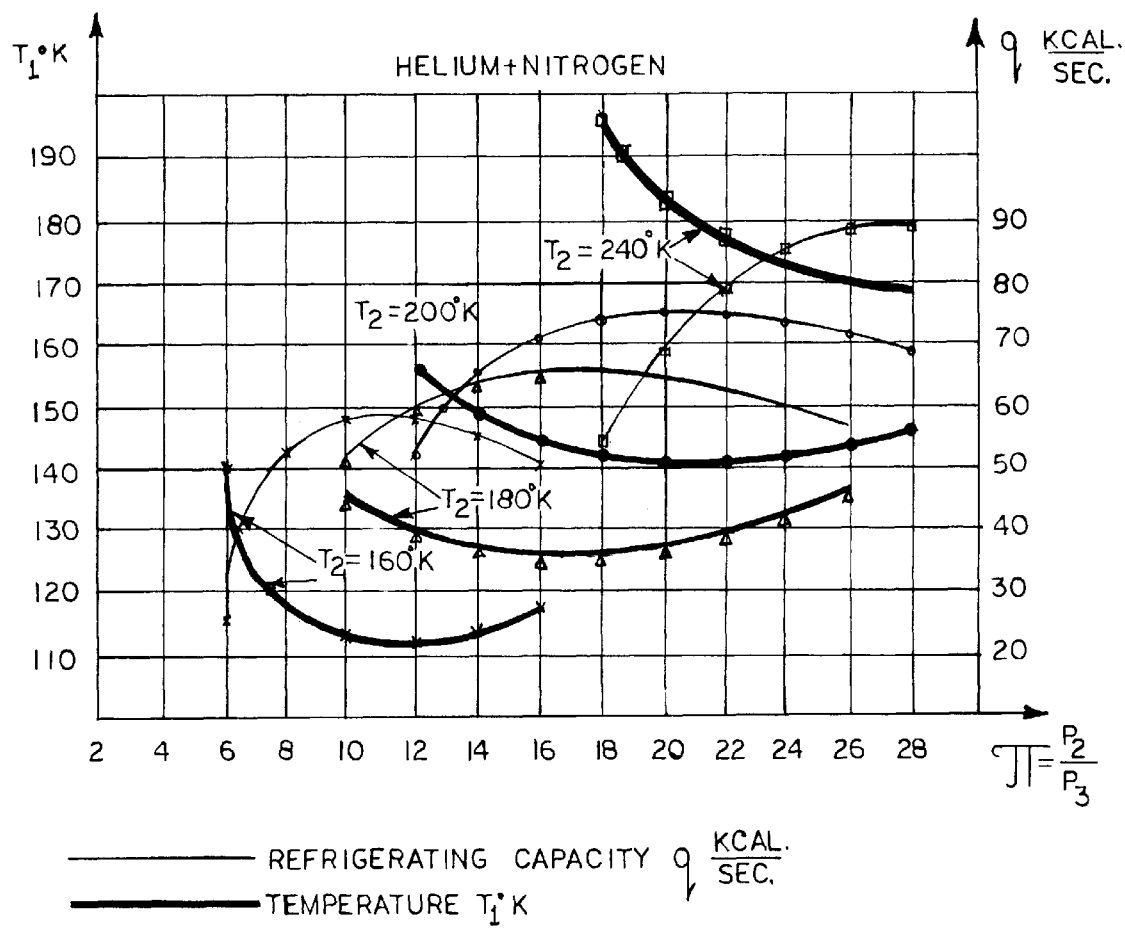
FIG. 10 is a graph showing of the dependence of the maximal temperature of the gas/liquid mixture and theoretical refrigerating capacity of the helium and nitrogen mixture on the pressure ratio.
Figure 9:
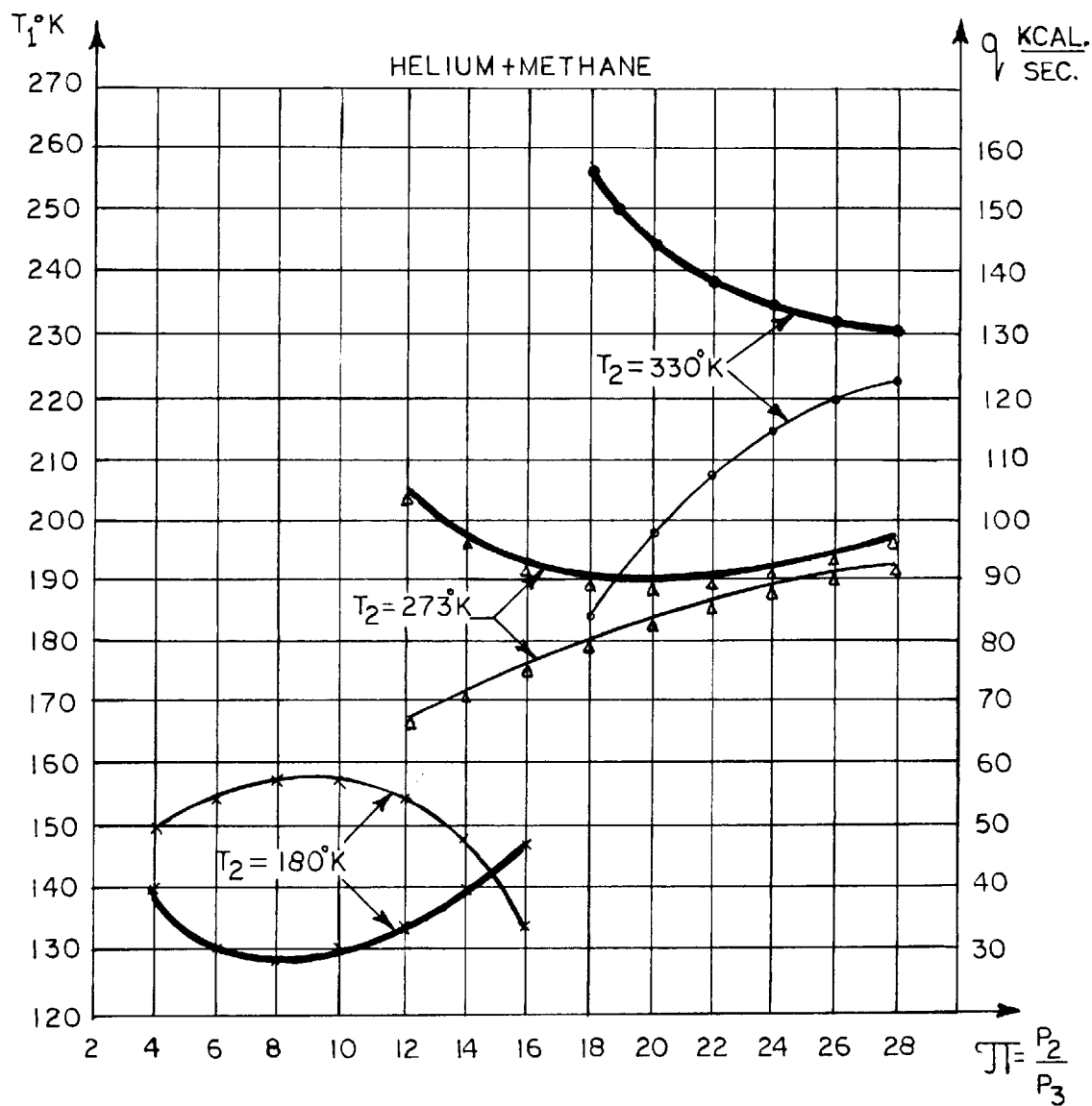
FIG. 9 is a graph showing of the dependence of the maximal temperature of the gas/liquid mixture and theoretical refrigerating capacity of the helium and methane mixture on the pressure ratio.

FIGS. 9 and FIG. 10 are a graphs showing the dependence of the theoretical temperature $T_1°$ k. (represented by the thicker lines) and the specific theoretical refrigerating capacity q k cal/sec (the thinner lines) on the pressure ratio using the helium and methane mixture and the helium and nitrogen mixture, respectively. These parameters are produced by $m_1$=1).

Although the preferred gas mixture utilizes helium as the non-condensable gas and nitrogen as the condensable second gas, it should be understood that other gase mixtures may be used. For example, hydrogen may be utilized as the non-condensable gas and ammonia may be used as the condensable second gas.

While this invention has been described fully and completely with special emphasis upon a preferred embodiment, it should be understood that within the scope of the appended claims the invention may be practiced otherwise than as specifically described herein.

We claim:

1. A method for transforming thermal energy into mechanical energy while simultaneously producing refrigerated air utilizing a mixture of a non-condensable first gas and a condensable second gas as a working fluid, comprising the steps of:

introducing a gas/liquid mixture of a non-condensable first gas and a condensable second gas into a rotary gas/liquid compressor having a rotor and isothermally compressing it therein;

separating said isothermally compressed gas/liquid mixture into a non-condensable first gas component having a low boiling temperature and a liquified second gas component;

isobarically heating said separated non-condensable first gas component in a heat exchanger having ambient air passing therethrough to cool said ambient air and produce cool refrigerated air therefrom;

discharging said isobarically heated first gas component as a working fluid from said heat exchanger into a rotary gas expander having a rotor operatively connected with said rotary gas/liquid compressor rotor;

adiabatically expanding said working fluid in said rotary gas expander to simultaneously rotate said gas expander rotor and said rotary gas/liquid compressor rotor and produce useful work and thereby extract heat from said adiabatically expanded working fluid to cool it to a temperature below the boiling temperature of said liquified second gas component;

discharging a portion of said expanded cooled working fluid from said gas expander into a vortex ejector/mixer; and introducing a portion of said separated liquified second gas component into said vortex ejector/mixer and mixing it with said expanded cool working fluid to serve as a coolant for said liquified second gas and to supplement said gas/liquid mixture that is introduced into said rotary gas/liquid compressor.

2. A method for transforming thermal energy into mechanical energy utilizing a mixture of a non-condensable first gas and a condensable second gas as a working fluid, comprising the steps of:

introducing a gas/liquid mixture of a non-condensable first gas and a condensable second gas into a rotary gas/liquid compressor having a rotor and isothermally compressing it therein;

separating said isothermally compressed gas/liquid mixture into a non-condensable first gas component having a low boiling temperature and a liquified second gas component;

isobarically heating said separated non-condensable first gas component in a heat exchanger having a low temperature heat source;

discharging said isobarically heated first gas component as a working fluid from said heat exchanger into a rotary gas expander having a rotor operatively connected with said rotary gas/liquid compressor rotor;

adiabatically expanding said working fluid in said rotary gas expander to simultaneously rotate said gas expander rotor and said rotary gas/liquid compressor rotor and produce useful work and thereby extract heat from said adiabatically expanded working fluid to cool it to a temperature below the boiling temperature of said liquified second gas component;

discharging a portion of said expanded cooled working fluid from said gas expander into a vortex ejector/mixer; and introducing a portion of said separated liquified second gas component into said vortex ejector/mixer and mixing it with said expanded cool working fluid to serve as a coolant for said liquified second gas and to supplement said gas/liquid compressor.

3. A power and refrigeration apparatus for transforming thermal energy into mechanical energy while simultaneously producing refrigerated air utilizing a mixture of a non-condensable first gas and a condensable second gas as a working fluid, comprising:

a rotary gas/liquid compressor having a rotor, a gas/liquid inlet, and a discharge outlet;

vortex separator means for separating a gas/liquid mixture into a gas component and a liquid component and having an inlet connected with said gas/liquid compressor discharge outlet, a gas outlet, and a liquid outlet;

a rotary gas expander having a rotor operatively connected with said rotary gas/liquid compressor rotor for simultaneous rotation therewith, a working fluid inlet, and a working fluid outlet;

heat exchanger means having an inlet connected with said vortex separator gas outlet, an outlet connected with said rotary gas expander working fluid inlet, said heat exchanger means disposed in heat exchange relation with ambient air;

vortex ejector/mixer means having a tangential inlet connected with said vortex separator liquid outlet, a nozzle inlet connected with said gas expander working fluid outlet, and a diffuser outlet connected with said gas/liquid compressor gas/liquid inlet;

a gas storage container containing a non-condensable first gas under pressure and having a gas inlet connected through one-way valve means with said rotary gas/liquid compressor discharge outlet, and a gas outlet connected with said rotary gas expander working fluid inlet;

a liquid storage container containing a liquified condensed second gas under pressure and having an inlet connected through one-way valve means with said vortex separator means liquid outlet, and an outlet connected with said vortex ejector/mixer means tangential inlet;

throttle means disposed between said vortex separator gas outlet and said heat exchanger means inlet, between said vortex separator gas outlet and said rotary gas expander working fluid inlet, between said heat exchanger outlet and said rotary gas expander working fluid inlet, between said gas storage tank and gas expander working fluid inlet, between said liquid storage tank outlet and said vortex ejector/mixer tangential inlet, between said vortex separator liquid outlet and said vortex ejector/mixer tangential inlet;

control means including temperature and pressure sensors connected with said throttle means for controlling the operation of selected ones thereof responsive to the temperature and pressure of working fluid entering said rotary gas expander working fluid inlet; and power take-off means connected with at least one of said rotors; wherein upon rotation of said rotary gas/liquid compressor rotor, a gas/liquid mixture of said non-condensable first gas and said liquified second gas is drawn thereinto and isothermally compressed and the isothermally compressed gas/liquid mixture is discharged into said vortex separator and separated into a non-condensable first gas component having a low boiling temperature and a liquified second gas component;

the separated non-condensable first gas component is conducted through said heat exchanger in heat exchange relation with said ambient air to isobarically heat said non-condensable first gas and cool said ambient air to produce cool refrigerated air therefrom;

said isobarically heated first gas component is discharged from said heat exchanger as a working fluid into said rotary gas expander and adiabatically expanded therein to simultaneously rotate said gas expander rotor and said rotary gas/liquid compressor rotor connected therewith to produce useful work and extract heat from said adiabatically expanded working fluid to cool it to a temperature below the boiling temperature of said liquified second gas component;

a portion of said expanded cooled working fluid is discharged from said rotary gas expander into said vortex ejector/mixer through said nozzle;

a portion of said separated liquified second gas from said vortex separator is introduced tangentially into said vortex ejector/mixer and mixed with said expanded cool working fluid entering through said nozzle to serve as a coolant for said liquified second gas and to supplement said gas/liquid mixture that is introduced into said rotary gas/liquid compressor; and said control means controlling the operation of selected ones of said throttle means responsive to the temperature and pressure of working fluid entering said rotary gas expander working fluid inlet detected by said temperature and pressure sensor means to control the flow of fluids through the apparatus.

4. The power and refrigeration apparatus according to claim 3 further comprising;

a thermally insulated housing substantially enclosing said rotary gas/liquid compressor, said rotary gas expander, said vortex separator means, said vortex ejector/mixer means, said gas storage container, and said liquid storage container.

5. The power and refrigeration apparatus according to claim 3 wherein said rotary gas expander and said rotary gas/liquid compressor each has an operating chamber, a rotor rotatably mounted in each respective said operating chamber on shafts; and said gas expander rotor and said gas/liquid compressor rotor are connected together by said shafts whereby rotation of said gas expander rotor causes simultaneous rotation of said gas/liquid compressor rotor.

6. The power and refrigeration apparatus according to claim 3 wherein said vortex ejector/mixer means has a vortex chamber surrounding said nozzle inlet and an elongate curvilinear looped fluid recirculation channel axially spaced from said nozzle inlet;

said tangential inlet and said vortex chamber configured to receive and cause said liquified second gas to form a swirling vortex in said vortex chamber and said nozzle is positioned to direct said expanded cooled working fluid into said swirling vortex and mix said expanded cooled working fluid with said liquified second gas to form said gas/liquid mixture and direct said gas/liquid mixture into said fluid recirculation channel;

said elongate curvilinear looped fluid recirculation channel configured to generate longitudinal and transverse vortex flow of a portion of said gas/liquid mixture and to recirculate said portion back into said swirling vortex; and another portion of said gas/liquid mixture being discharged through said diffuser outlet into said rotary gas/liquid compressor to be compressed in said rotary gas/liquid compressor.

7. The power and refrigeration apparatus according to claim 3 wherein said rotary gas expander and said rotary gas/liquid compressor each has an oval-shaped operating chamber with a peripheral side wall which is oval-shaped in cross section, parallel opposed facing flat end walls, and a continuous cylindrical-shaped guide groove concentric with said peripheral side wall formed in each said end wall;

a cylindrical rotor having a circular side wall, parallel opposed flat end walls, a concentric shaft extending outwardly from each said end wall, and at least two mutually perpendicular slots extending radially through said rotor with a radially extending portion of each said slot extending through said end walls, said rotor rotatably mounted by said shafts eccentrically in said operating chambers relative to the major axis of said operating chamber;

at least two elongate rectangular rotor blades one slidably mounted in each of said slots extending through said rotor in mutually perpendicular relation and each independently movable relative to the other in a radial direction, each said rotor blade having a guide element extending from opposed sides and through said radial extending portion of each said slot outwardly from said rotor end walls and slidably received in said cylindrical-shaped guide groove in said operating chamber end walls;

said gas expander and said gas/liquid compressor rotor connected together by said shafts whereby rotation of said gas expander rotor causes simultaneous rotation of said gas/liquid compressor rotor, and upon rotation of said gas expander rotor and said gas/liquid compressor rotor said guide elements traveling in said cylindrical-shaped guide grooves causes said rotor blades to extend and retract radially with their outer ends following the inner periphery of the respective oval-shaped side walls of said operating chambers with a constant minimum clearance between the outer tip ends of said blades and said inner peripheries;

said rotary gas expander working fluid inlet and said working fluid outlet are each formed in said rotary gas expander operating chamber side wall and configured to receive said isobarically heated first gas component and discharge said adiabatically expanded cooled working fluid, respectively, tangential to the axis of rotation of said rotor; and said rotary gas/liquid compressor gas/liquid inlet and said discharge outlet are each formed in said gas/liquid compressor operating chamber side wall and configured to draw said gas/liquid mixture into said compressor operating chamber and discharge said gas/liquid mixture tangential to the axis of rotation of said rotor upon rotation thereof.

8. The power and refrigeration apparatus according to claim 7 wherein said cylindrical guide grooves in said operating chamber end walls have a centerline in the plane of rotation defined by the equation:

$$x^2+y^2=r^2;$$

where x and y represent the vertical and horizontal coordinates, r represents the circuit radius and is greater than the eccentrically off set distance between the center of rotor rotation relative to the central axis of said operating chamber and said guide grooves.

9. The power and refrigeration apparatus according to claim 7 wherein said inner periphery of said oval-shaped side walls of said gas expander and said gas/liquid compressor operating chambers in the plane of rotor rotation is configured according to the equation $$\frac{x^2}{h^2} + \frac{y^2}{(h+1/4L)^2 - L^2} = 1$$

where x and y represent vertical and horizontal coordinates of said operating chambers, h is equal to one-half of the length of said rotor blades and equal to one-half of the major axis of said oval-shaped inner periphery, and L is equal to the eccentrically offset distance between the center of said oval-shaped operating chambers and said guide grooves.

10. The power and refrigeration apparatus according to claim 7 further comprising roller means on each said rotor disposed adjacent said radially extending slots and engaged with said rotor blades to support and facilitate extension and retraction thereof.

11. The power and refrigeration apparatus according to claim 7 further comprising guide roller means at the outer of said rotor blade guide elements rotatably engaged in said cylindrical-shaped guide grooves in said operating chamber end walls.

12. The power and refrigeration apparatus according to claim 7 further comprising lubrication means connected with said guide grooves in said operating chamber side walls to provide lubrication to said guide roller means, and lubricant seal means surrounding each said guide groove disposed between the inner surfaces of each said operating chamber end walls and the outer surfaces of each said rotor end walls to form a lubricant sealing relation therebetween.

13. The power and refrigeration apparatus according to claim 7 further comprising:

seal means disposed between the outer surfaces of each said rotor end walls periphery and the inner surface of each said operating chamber end walls to form a sealing relation therebetween; and seal means disposed in said circular side wall slots through which said blades extend to form a sealing relation on at least three flat surfaces of each said blade.

14. The power and refrigeration apparatus according to claim 7 wherein said rotary gas expander working fluid inlet and said working fluid outlet are each substantially the same width as the width of said rotary gas expander operating chamber; and said rotary gas/liquid compressor gas/liquid inlet and said discharge outlet are each substantially the same width as the width of said rotary gas/liquid compressor operating chamber.

* * * * *